United States Patent [19]

Perales

[11] 4,037,617
[45] July 26, 1977

[54] MULTIWAY PNEUMATIC VALVE AND ITS APPLICATION TO BRAKE

[76] Inventor: Fernando Perales, 15, rue Roger Salengro, 95230 Soisy-sous-Montmorency, France

[21] Appl. No.: 637,502

[22] Filed: Dec. 4, 1975

[51] Int. Cl.² .......................................... G05D 11/00
[52] U.S. Cl. .................. 137/118; 137/512.15; 137/512.4; 137/608; 137/613; 137/596.15; 303/28
[58] Field of Search ............... 251/61.1, 331; 137/118, 137/512, 512.15, 512.4, 608, 612.1, 613, 596.15, 596.16, 596.18, 859; 303/28, 29, 30

[56] References Cited

U.S. PATENT DOCUMENTS

| | | | |
|---|---|---|---|
| 1,986,831 | 1/1935 | Valley | 137/512.4 |
| 2,043,849 | 6/1936 | Bixler | 137/512 |
| 2,139,313 | 12/1938 | Neubauer | 137/512 |
| 2,254,990 | 9/1941 | Blank | 137/118 |
| 2,345,140 | 3/1944 | McCollum et al | 137/512 |
| 2,758,609 | 8/1956 | Dickert et al. | 137/512 |
| 2,856,955 | 10/1958 | Winkelman | 137/512 |
| 3,045,605 | 7/1962 | Nutten et al. | 137/512.4 |
| 3,575,190 | 4/1971 | Puster et al. | 137/596.18 |
| 3,653,408 | 11/1969 | Coiner | 251/61.1 |
| 3,823,733 | 7/1974 | DuBois et al. | 251/61.1 |

FOREIGN PATENT DOCUMENTS

| | | | |
|---|---|---|---|
| 1,019,907 | 3/1950 | France | 137/859 |
| 1,282,392 | 11/1968 | Germany | 137/118 |

Primary Examiner—William R. Cline
Assistant Examiner—H. Jay Spiegel
Attorney, Agent, or Firm—William Anthony Drucker

[57] ABSTRACT

Multiway pneumatic valve comprising supply inlet and a plurality of separate outlets connected to the inlet by separate circuits.

Third and fourth circuits are respectively in series with first and second circuits. Calibrated diaphragms are exposed at their periphery to the supply pressure and in their central portion to the pressure in the tank which they control. If a tank fails, the corresponding diaphragm isolates this tank. Flaps each comprising a loose strip isolate the whole tank system in the case of a supply failure.

The valve can be applied to any gas distribution problem and more particularly to pneumatic brake circuits.

5 Claims, 7 Drawing Figures

MULTIWAY PNEUMATIC VALVE AND ITS APPLICATION TO BRAKE

BACKGROUND OF THE INVENTION

The present invention relates to a multiway pneumatic valve. It also relates to the application of this valve to brake systems or circuits.

As essential components multiway valves comprise a certain number of flaps which are generally rounded, are made from a resilient material and cooperate with bearing surfaces in the body of the valve. To ensure an adequate contact leading to good sealing, these flaps are generally integral with a mechanical member serving as a guide for the same. In another known construction, the flaps can comprise a metal ball which is supported on a resilient bearing surface which also requires a certain guidance. In all the known constructions it is necessary to have a certain number of mechanical parts which require precise and expensive machining.

BRIEF SUMMARY OF THE INVENTION

One of the objects of the present invention is to permit the construction of a multiway valve whose flaps can be manufactured in a particularly inexpensive manner and which are very reliable.

The invention relates to a multiway pneumatic valve comprising an inlet and several outlets each connected to the inlet by a separate pneumatic circuit, whereby each of the said circuits is provided with a flap, wherein it comprises at least two flat blocks enclosing at least one diaphragm and wherein the flaps each comprise a loose strip cut from the said diaphragm and which is supported on bearing surfaces provided in at least one of the said blocks.

Thus, the flap has no mechanical member which leads to more economic manufacture and simultaneously a greater operating reliability. Moreover, the loose strip is not guided and consequently its operation cannot be disturbed by this.

According to a preferred embodiment of the invention, all the openings in the diaphragm are surrounded by a bead made from a resilient material integral with the said diaphragm.

In this way, even if the securing of the diaphragm by the flat blocks is not performed in a uniform manner, a satisfactory sealing between the different circuits is obtained.

The invention also aims at a protective or safety valve for the brake circuit constituting an application of the above-mentioned multiway valve as a new industrial product.

Brake circuits generally comprise at least one working tank having a safety function and permitting the supply of the pipes at a given pressure. In general these circuits have four tanks which are used for the tractor (front tank), for the trailer (rear tank), for the auxiliary equipment and for stand-by purposes.

When one of the tanks becomes defective due to a leak on its wall or on the circuit which it controls, it is to be feared that this defect, due to intercommunication will lead to the failure of the other tanks. Devices which are generally called safety valves are known whose function is to isolate the defective tank and maintain the rest of the circuit in operation.

The hitherto known safety valves comprise one flap per tank served. This flap generally comprises a cylindrical member which slides in a tubular member via which the supply air enters, and has a flange which is supported via a joint on the end of the tubular member in order to seal the same. The flap has a tendency to open when the supply pressure is greater than the pressure in the tank served, but means are provided to prevent its opening when the pressure in the tank drops below a predetermined value. In the known constructions these means comprise a diaphragm operated by a spring and which bears on the flap to prevent its opening. However, the diaphragm is also subject to the pressure in the tank which opposes the action of the spring when the said pressure is sufficient to permit the flap to open. If the tank is defective and if the pressure is below a certain value, the said tank is isolated and the remaining tanks cannot empty into the defective tank.

In the known constructions which generally have a complicated structure, the supply pressure must simultaneously bring about the opening of the flap and overcome the thrust of the diaphragm. However, a not inconsiderable friction occurs between the cylindrical flap and the tubular member wherein it slides and this can be further increased by jamming due to the substances used for ensuring the sealing or even by blocking due to the gel. Consequently, there is a very prejudicial lack of operational reliability.

Moreover, in the known constructions, the above-mentioned diaphragms for the different tanks comprise a single generally thin and fragile member. Thus, besides the risk of breaking there is a serious danger of intercommunication between the different tanks.

Another object of the invention is to permit the construction of a simple and economic safety valve which does not have the above disadvantages and which more particularly leads to high operating reliability.

According to the invention, the safety valve comprises the above-mentioned multiway valve comprising three flat blocks enclosing two diaphragms whereby each of the flaps constituting a first flap has the tendency to open under the action of the supply pressure, and, associated with each circuit, a diaphragm calibrated by a spring exposed to the pressure in the tank served by the said circuit whereby this diaphragm under the action of its calibrating spring prevents communication between the inlet and the tank served, wherein the calibrated diaphragm over part of its surface is exposed to the supply pressure and over another part of its surface to the pressure in the tank served, the first of these parts being much larger than the second and wherein the said diaphragm is applied by its spring to a bearing surface in such a way as to constitute a seal located downstream of the first flap relative to the air circulation.

Thus the supply air after easily raising the first flap comprising a loose strip acts on the peripheral area of the preponderant surface of the calibrated diaphragm and its action is further aided by the pressure in the tank which acts on the central portion. The bearing surface to which the diaphragm is applied is reduced to an annular zone of reduced dimensions located between the two above-mentioned areas and the two pressure actions are synchronized to easily overcome any jamming which might occur.

According to a preferred embodiment of the invention the diaphragms calibrated relative to the various circuits constitute separate members and are cut from a cloth-faced reinforced sheet.

This obviates the danger of breaking and of intercommunication between the tanks which could occur when the various diaphragms are constituted by a single member.

According to a preferred embodiment of the invention the safety valve serves two tanks of a first category by a first system of circuits and two tanks of a second category by a second system of circuits, whereby the circuits of the second system are respectively in series with those of the first system, and means are provided to maintain circulation in all the circuits of the second system, even when one of the circuits of the first system is closed by its calibrated diaphragm. These means comprise a second flap mounted on each of the circuits of the second system and a pipe joining the circuits of the second system with the first and the second flap.

BRIEF DESCRIPTION OF THE DRAWINGS

Other and further objects of the present invention will be apparent from the following description and claims and are illustrated in the accompanying drawings, which by way of illustration show preferred embodiments of the present invention and the principles thereof, and what are now considered to be the best modes contemplated for applying these principles. Other embodiments of the invention embodying the same or equivalent principles may be used and structural changes may be made as desired by those skilled in the art without departing from the present invention and the scope of the appended claims. In the drawings show:

DETAILED DESCRIPTION OF THE PREFERRED EMBODIMENTS

Figure 1:
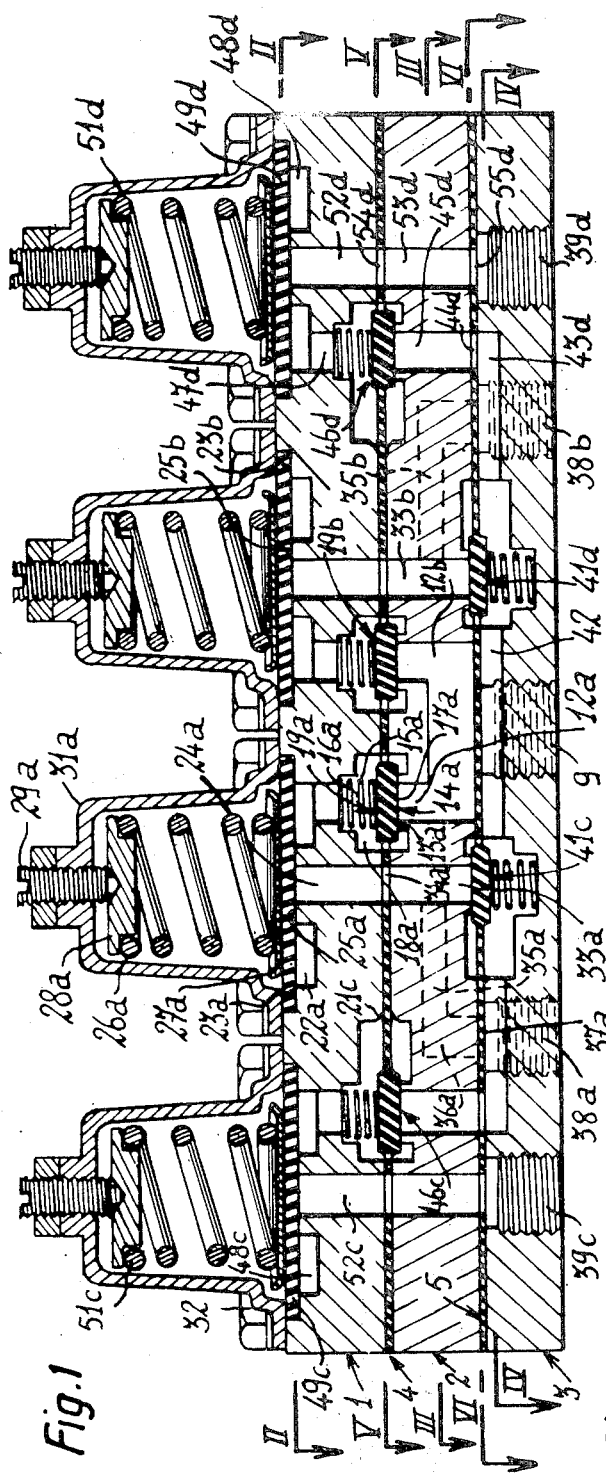
FIG. 1 is a section in elvation following I—I in FIGS. 2, 3 and 4 of a safety valve for a break circuit according to the invention.
Figure 2:
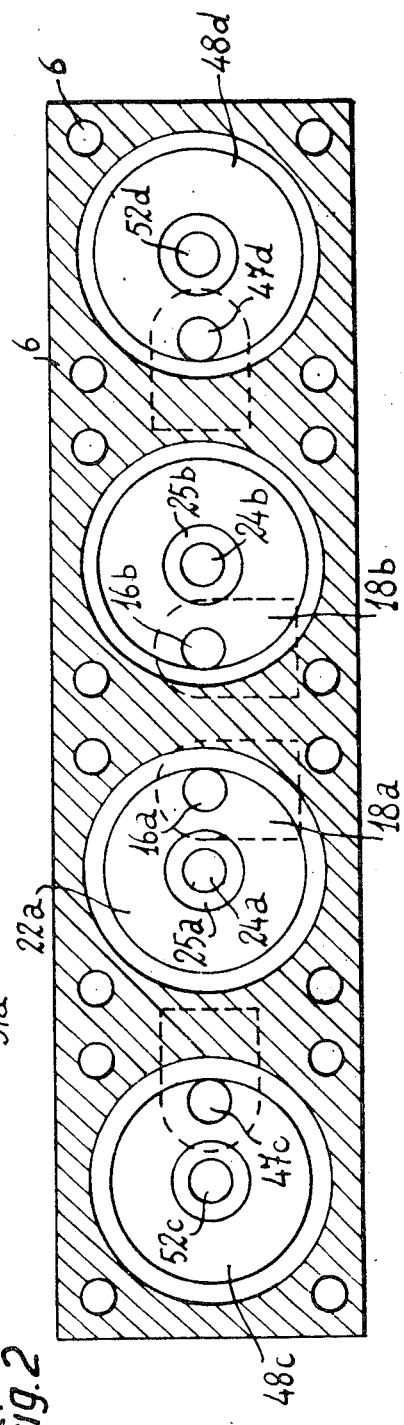
FIG. 2 is a plan section following II—II of FIG. 1.
Figure 3:
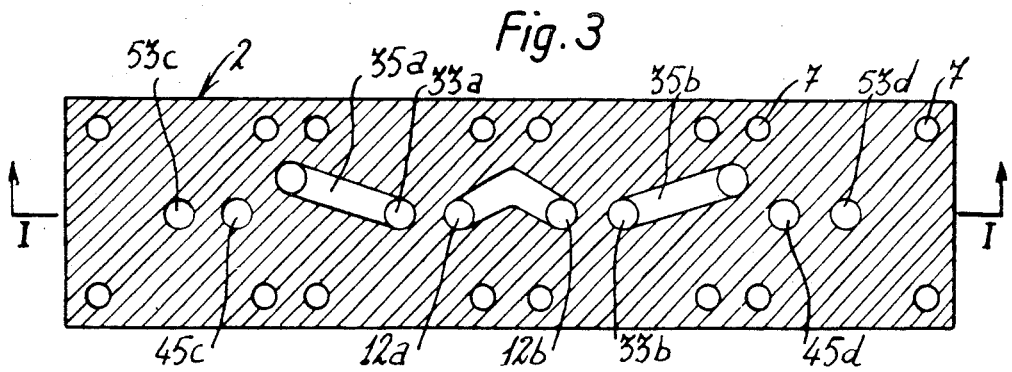
FIG. 3 is a plan section following III—III of FIG. 1.
Figure 4:
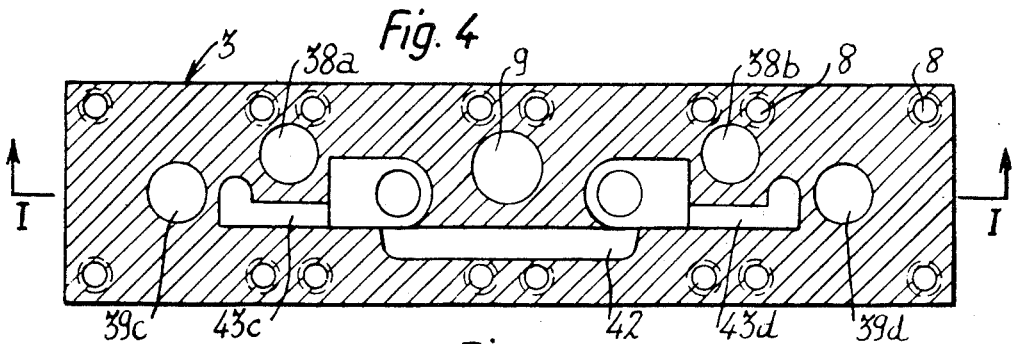
FIG. 4 is a plan section following IV—IV of FIG. 1.
Figure 5:
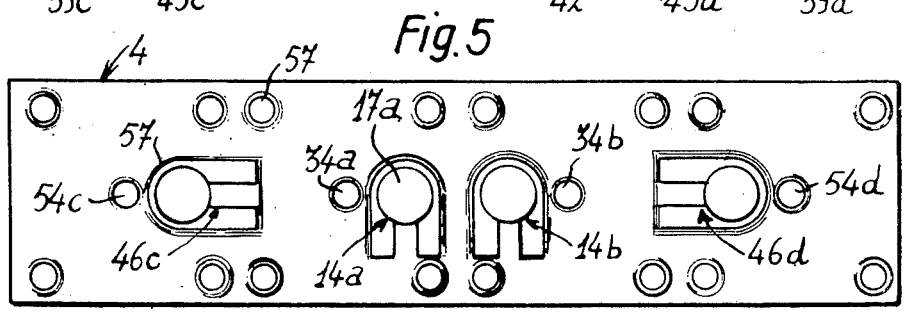
FIG. 5 is a plan view following V—V of FIG. 1 of a first diaphragm of the valve.
Figure 6:
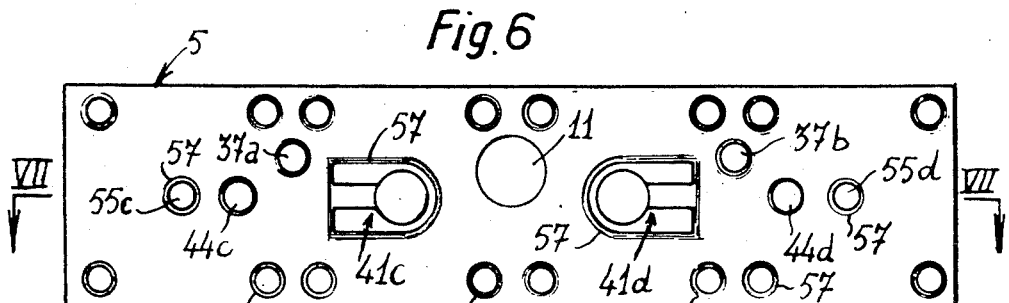
FIG. 6 is a plan view following VI—VI of FIG. 1 of a second diaphragm of the valve.
Figure 7:
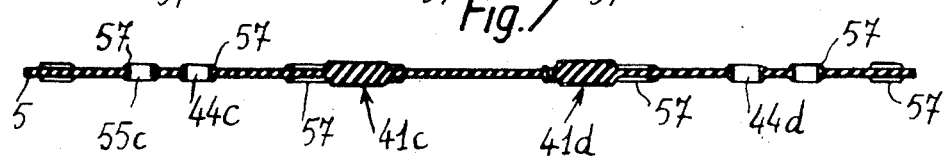
FIG. 7 is a sectional view following VII—VII of FIG. 6.

With reference to the above drawings, the multiway valve used as a safety valve on a brake circuit comprises three flat blocks 1, 2, 3 enclosing two diaphragms 4, 5. Locking is obtained by not shown screws traversing blocks 1 and 2 by smooth holes such as 6, 7 and screwing into the tappings 8 of block 3.

Block 3 comprises an air inlet 9 which is connected to the outlet of a regulator. After passing through an opening 11 in diaphragm 5, inlet 9 is sub-divided into two substantially symmetrical channels 12a, 12b in block 2.

At the outlet from block 2 channel 12a is surrounded by a circular bearing surface 13a on which is supported a loose strip 14a cut from diaphragm 4 under the action of a spring 15a located in a channel 16a made in block 1 in the extension of channel 12a. To the right of channel 12a loose strip 14a has a thickness allowance 17a to improve its rigidity. This thickness allowance can, for example, be obtained by means of stuck patches. Strip 14a can move in a chamber 18a formed by two facing cavities made respectively in blocks 1 and 2. Thus this strip constitutes a first flap 19a on the air circuit issuing from inlet 9. Fillets such as 21c are provided to prevent damage to the strip 14a during its movements.

Channel 16a issues into a circular groove 22a in block 1 facing an advantageously circular diaphragm 23a concentric to groove 22a and cut from a cloth-faced sheet reinforced with resilient material. The inlet of a channel 24a drilled into block 1 faces the centre of this diaphragm. The cross-section of this channel is relatively small relative to the annular surface defined by groove 22a. The annular surface is located between the opening of channel 24a and groove 22a constituting a bearing surface 25a to which is applied diaphragm 23a by means of a spring 26a via a mounting base 27a. The bearing surface 25a is made as small as possible but only to the extent that it does not impair diaphragm 23a. Spring 26a is maintained compressed via a mounting base 28a whereon is supported an adjusting screw 29a screwed into a cap 31a fixed by screws such as 32.

Channel 24a is continued by a channel 33a drilled into block 2 after traversing a drilled hole 34a of diaphragm 4. A channel 35a is laterally inserted into channel 33a and after an elbow 36a and passing through a drilled hole 37a in diaphragm 5 issues forth in front of an outlet 38a in block 3 and which is to be connected to the front tank of the vehicle.

In the same way channel 12b is connected to an outlet 38b to be connected to the rear tank via a circuit b substantially identical to circuit a described hereinbefore. Circuit b substantially comprises a flap 19b and a calibrated diaphragm 23b. For reasons of clarity, FIG. 1 does not show all the b references.

The front and rear tanks constitute a first category of tanks and circuits a and b constitute a first system of circuits serving the two tanks.

Hereinafter will be described a second system of circuits which will respectively carry the reference letters c and d and which serve outlets 39c and 39d which are to be connected to tanks of a second category which are respectively the stand-by tank and the auxiliary services tank.

Circuit c is in series with circuit a and circuit d is in series with circuit b. Only circuit d will be described in detail as circuit c is substantially identical to it.

Downstream of the outlet from channel 35b, channel 33b issues onto a flap comprising a loose strip 41d analogous to flap 19a described hereinbefore. Flap 41d constitutes a second flap placed on the circuit joining inlet 9 and outlet 39d.

Downstream of flap 41d, circuit d is connected to circuit c by a pipe 42 in block 3. Circuit d is also continued by a channel 43d in block 3, a drilled hole 44d in diaphragm 5 and a channel 45d drilled into block 2 up to the flap comprising a loose strip 46d analogous to flap 19a.

Flap 46d is followed by a channel 47d which issues into a circular groove 48d identical to groove 22a and which faces a calibrated diaphragm 49d. This diaphragm and its calibrating device are identical to the corresponding members of circuits a and b and more particularly comprise a calibrating spring 51d.

In the center of diaphragm 49d opens a channel 52d drilled into block 1 which is extended by a channel 53d drilled into block 2 via a drilled hole 34d in diaphragm 4 and a drilled hole 55d in diaphragm 5 up to outlet 39d.

All the openings made in diaphragms 4 and 5 are surrounded by a bead such as 57 made from a resilient material which can be joined or molded to the diaphragm. These beads make it possible to obtain a good sealing of the channels passing through the diaphragms although the uniform locking of the flat blocks 1, 2 and 3 is often difficult to obtain.

In the described embodiment, the calibration of diaphragm 23a by spring 26a by means of adjusting screw 29a is regulated in such a way that diaphragm 23a is raised from bearing surface 25a when the pressure in groove 22a reaches 5.5 bars, channel 24a is assumed to be at atmospheric pressure. The same procedure is adopted for calibrating diaphragm 23b.

Diaphragms 49c and 49c are calibrated in such a way as to be raised when the pressure in the corresponding grooves 48c and 48d reaches 5 bars, the respective channels 52c and 52d being assumed as at atmospheric pressure.

Obviously the numerical values are only given as examples.

The operation of the valve will now be described.

The air admitted via inlet 9 easily raises flap 19a because spring 16a only exerts a very limited pressure which merely serves to prevent loose strip 15a assuming a neutral position.

In normal operation the supply pressure exceeds 5.5 bars. Thus, this pressure raises diaphragms 23a and 23b and the air is passed via the respective circuits a and b to the outlets 38a and 38b where it supplies the front and rear tanks.

Via circuits c and d which are in series with circuits a and b the air reaches diaphragms 49c and 49d and also raises the latter; despite the supplementary loss of charge by these circuits the said diaphragms are calibrated to 5 bars. The air then escapes via outlets 39c and 39d to supply the stand-by tank and the auxiliary services tank.

In the case of a supply failure, the tank system is immediately isolated by flaps 19a and 19b even if the pressure in the tanks exceeds 5.5 bars and even if the calibrated diaphragms remain raised.

Thus, for example, in the case of a fault on the stand-by tank, a 5 bar supply to the auxiliary services tank is ensured and a 5.5 bar supply to the front and rear tanks is also ensured. Thus, if as a result of the leak in question the pressure in grooves 48c and 48d drops below 5 bars, diaphragm 49c is applied to its bearing surface and isolates the faulty tank which is assumed to be at atmospheric pressure. However, diaphragm 49d, whose central area is also subject to the pressure in the auxiliary services tank remains raised to supply the said tank. For the same reason, diaphragms 23a and 23b remain raised to supply the front and rear tanks.

The operation is analogous if the respective functions of the stand-by tank and the auxiliary services tank are reversed.

It should be noted that due to the difference in the calibration values of the diaphragms, the two above tanks can receive a residual supply even if one of them fails.

In the case of a defect to the front tank, diaphragm 23a isolates this tank in accordance with the same procedure as soon as the supply pressure drops below 5.5 bars as a result of the defect. As circuit a is closed, circuit c is supplied via circuit b by means of intercommunicating channel 42. Flap 41c then prevents any leakage towards the faulty tank even in the case of diaphragm 23a breaking. Flaps 46c and 46d then perform an identical safety function.

Operation is symmetrical if the rear tank fails.

Thus, the valve according to the invention permits an excellent isolation of any defective tank even if there is more than one tank defective at the same time, provided that the front and rear tanks do not fail simultaneously. Moreover, the design and operation of the calibrated diaphragms ensures an excellent reliability of operation accompanied by economic manufacture. Moreover, the supply pressure is applied to a large surface area of the diaphragm and the reduced bearing surface area considerably decreases any danger of jamming.

Obviously the present invention is not limited to the described embodiments and numerous variants are possible thereto without passing beyond the spirit or scope of the invention. Thus, the four calibrated diaphragms can be arranged in a square to reduce the overall dimensions. It is also possible to reverse the air circulation direction relative to each diaphragm, whereby the air enters via the channel coaxial to the diaphragm and leaves via the peripheral groove.

What is claimed is:

1. A fluid feeding system for feeding a fluid under different pressures to first and second outlets, said feeding system including a fluid supply inlet; first and second conduits communicating with the fluid supply inlet; first and second check valve means respectively mounted in the first and second conduits for controlling the flow of fluid therein; first and second diaphragms each having first and second faces, means cooperating with the first face of the respective diaphragms, said means forming a circular opening, an annular bearing surface surrounding said opening and an annular chamber surrounding said annular bearing surface; adjustable spring means respectively cooperating with the second faces of the respective diaphragms, the said annular chambers each having an annular open surface facing the diaphragm, the area of said open surface being substantially larger than the area of said annular bearing surface, the diaphragm being adapted to assume a rest position in which its first face closes the opening and the annular bearing surface and isolates each said annular chamber from its said surrounded circular opening, and a raised position in which the annular chamber and circular opening are opened and connected together, said first and second conduits communicating with the respective annular chambers which cooperate with the first and second diaphragms, respectively, third and fourth conduits respectively communicating with the circular openings downstream of the respective first and second diaphragms, each of said third and fourth conduits having an outlet to a closed tank, and a bypass bypassing said closed tanks comprising each of said third and fourth conduits forming a chamber having therein a seat and an annular bearing surface surrounding the conduit, third and fourth valve means each comprising a diaphragm made of resilient material, a flap valve cut from said diaphragm and engaging the bearing surface, and spring means supported on said seat and engaging the flap valve, said third and fourth conduits communicating through said third and fourth valve means with auxiliary tank means.

2. A fluid feeding system as claimed in claim 1, said system comprising first and second flat blocks having parallel opposite surfaces forming an elongated gap therebetween, the said conduits being bored through said blocks and the said chambers being formed within said blocks, whereas the diaphragms of the first and second valve means consist of a single resilient sheet inserted in the said gap, the second block having an outer surface which froms the said annular chambers and the said annular bearing surfaces cooperating with the said first and second diaphragms, the said flap valves each including a cut out portion of the said sheet and reinforcement patches stuck on said cut out portion.

3. A fluid feeding system according to claim 2, wherein the first and second diaphragms are cut from a cloth-faced reinforced sheet.

4. A fluid feeding system as claimed in claim 1, further comprising third and fourth diaphragms each having first and second faces, means cooperating with the first face of the respective diaphragms, said means forming a circular opening, an annular bearing surface surrounding said opening and an annular chamber surrounding said annular bearing surface; adjustable spring means respectively cooperating with the second faces of the respective diaphragms, the said annular chambers each having an annular open surface facing the diaphragm, the area of said open surface being substantially larger than the area of said annular bearing surface, the diaphragm being adapted to assume a rest position in which it closes and isolates one from the other the annular chamber and the circular opening, and a raised position in which the annular chamber and circular opening are opened and connected together; fifth and sixth conduits and fifth and sixth valve means respectively mounted in the fifth and sixth conduits each of said fifth and sixth conduits forming a chamber having therein a seat and an annular bearing surface surrounding the conduit, each of said fifth and sixth valve means comprising a diaphragm made of resilient material, a flap valve cut from said diaphragm and engaging the bearing surface, and spring means supported on said seat and engaging the flap valve; said fifth and sixth conduits communicating with the respective annular chambers which cooperate with the third and fourth diaphragms, respectively; said first and second outlets being arranged on said third and fourth conduits upstream of said third and fourth valve means, the fifth conduit being connected to the third conduit downstream of the third valve means and the sixth conduit being connected to the fourth conduit downstream of the fourth valve means, the fifth and sixth conduits being mutually interconnected, and seventh and eighth conduits respectively communicating with the circular openings of the third and fourth diaphragms and each having an outlet.

5. A fluid feeding system according to claim 4, wherein the spring means cooperating with the third and fourth diaphragms exert a pressure thereon which is substantially lower than the pressure exerted by the spring means cooperating with the first and second diaphragms.

* * * * *